US008359629B2

(12) United States Patent
Kohlenberg et al.

(10) Patent No.: US 8,359,629 B2
(45) Date of Patent: Jan. 22, 2013

(54) METHOD AND DEVICE FOR CONTROLLING USE OF CONTEXT INFORMATION OF A USER

(75) Inventors: Tobias M. Kohlenberg, Portland, OR (US); Selim Aissi, Beaverton, OR (US); Dennis M. Morgan, Pine Grove, CA (US); Alan D. Ross, Shingle Springs, CA (US); Jim S. Baca, Corrales, NM (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 12/567,386

(22) Filed: Sep. 25, 2009

(65) Prior Publication Data

US 2011/0078758 A1 Mar. 31, 2011

(51) Int. Cl.
*G06F 17/00* (2006.01)
(52) U.S. Cl. ............. 726/1; 709/223; 455/411; 713/193
(58) Field of Classification Search .................. None
See application file for complete search history.

(56) References Cited

U.S. PATENT DOCUMENTS

| 5,960,442 | A | 9/1999 | Pickering |
| 7,072,956 | B2 * | 7/2006 | Parupudi et al. ............ 709/223 |
| 7,877,781 | B2 * | 1/2011 | Lim ................................. 726/1 |
| 2002/0035605 | A1 | 3/2002 | McDowell et al. |
| 2002/0174073 | A1 | 11/2002 | Nordman et al. |
| 2005/0003804 | A1 | 1/2005 | Huomo et al. |
| 2005/0060575 | A1 | 3/2005 | Trethewey et al. |
| 2008/0194233 | A1 * | 8/2008 | Henry ........................... 455/411 |
| 2009/0319806 | A1 * | 12/2009 | Smith et al. ................... 713/193 |
| 2010/0146583 | A1 * | 6/2010 | Prehofer et al. ................. 726/1 |

FOREIGN PATENT DOCUMENTS

| EP | 1217857 A2 | 12/2001 |
| EP | 2302886 A1 | 3/2011 |
| JP | 2001-523074 A | 11/2001 |
| JP | 2008-539500 A | 11/2008 |
| WO | 2006/106303 A1 | 10/2006 |
| WO | WO 2006/106303 | * 10/2006 |
| WO | 2006/115442 A1 | 11/2006 |

OTHER PUBLICATIONS

European Search Report for EP Application No. 10251637.4-2414, Feb. 22, 2011, 3 pages.

(Continued)

*Primary Examiner* — Fikremariam A Yalew
(74) *Attorney, Agent, or Firm* — Barnes & Thornburg LLP

(57) ABSTRACT

A method and device for controlling use of context information of a user includes establishing a context policy enforcement engine on a mobile computing device. The context policy enforcement engine may be embodied as software and/or hardware components. The context policy enforcement engine retrieves context policy data in response to receiving a request for context information related to a user. The context policy data defines a set of context rules for responding to context requests. The context policy enforcement engine responds to the request based on the set of context rules.

25 Claims, 5 Drawing Sheets

OTHER PUBLICATIONS

"Location Awareness", retrieved from Wikipedia last modified Aug. 20, 2009 from http://en.wikipedia.org/wiki/Location_awareness; 5 pages.

Forrest, Brady, "iPhone's Location-Aware Apps", Jul. 2008, retrieved from http://radar.oreilly.com/2008/07/iphone-location-aware-apps.html; 2 pages.

Zeman, Eric, "Google's 'Mail Goggles' Set to Be Your E-Mail Wingman—Google Blog", Oct. 7, 2008, retrieved from http://www.iinformationweek.com/blog/main/archives/2008/10/googles_mail_go.html.

Office Action Received for European Patent Application No. 10251637.4 mailed on Mar. 22, 2011, 7 pages.

Office Action received for Japanese Patent Application No. 2010-206462, mailed Oct. 2, 2012, 3 pages of Japanese Office Action and 4 pages of unofficial English translation.

* cited by examiner

METHOD AND DEVICE FOR CONTROLLING USE OF CONTEXT INFORMATION OF A USER

BACKGROUND

Location-aware computing allows computing devices, especially mobile computing devices such as cellular phones and mobile computers, to perform various functions based on the location of the location-aware enabled computing device. Such functions may include, for example, adapting user interfaces, tailoring software applications and/or application data, and publishing data related to or based on the location of the computing device. Additionally, other devices remote from the location-aware enabled computing device may interact with the enabled device to obtain location information and perform remote functions based on such location information such as publishing the location of the user of the device.

The location of a computing device may be derived from the device itself (e.g., the computing device includes global positioning system (GPS) circuitry) or may be calculated based on functions or use of the device. In typical location-aware computing devices and associated systems, no control of the dissemination of the location information is available. As such, the use of the location information may be publicly available with little control or, in some cases, knowledge by the user of the computing device.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
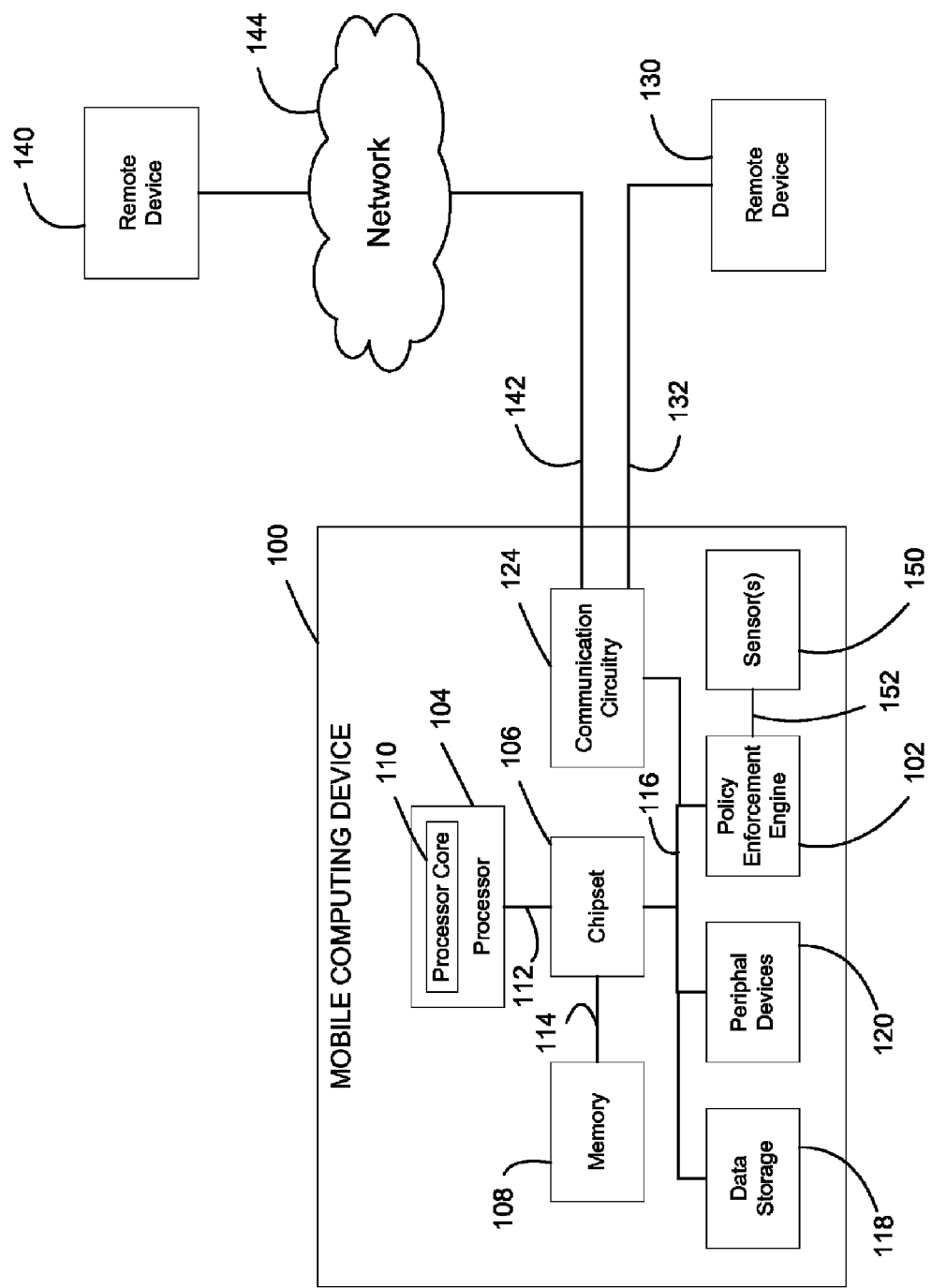
FIG. 1 is a simplified block diagram of one embodiment of a mobile computing device for controlling use of context information of a user.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention implemented in a computer system may include one or more bus-based interconnects between components and/or one or more point-to-point interconnects between components. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, a mobile computing device 100 configured to control use of context data related to a user of the device 100 includes a context policy enforcement engine 102, a processor 104, a chipset 106, and memory 108. The computing device 100 may be embodied as any type of portable computing device capable of performing the functions described herein. For example, in some embodiments, the computing device 100 is embodied a cellular phone, a personal data assistant, a laptop computer, a mobile internet device, or other computer-based mobile device.

The context policy enforcement engine 102 may be embodied as a plurality of components including hardware components, firmware components, and software components that interact cooperatively to provide amount of privacy and control over context data related to a user of the device 100 as described in more detail herein. As such, the context policy enforcement engine 102 may include a dedicated hardware processor and/or other circuitry separate from the processor 104 of the device 100. Additionally, the policy enforcement engine may include firmware instructions configured to initialize or otherwise "boot" the policy enforcement engine in a secured environment. In some embodiments, the policy enforcement engine 102 may include or otherwise be communicatively coupled to memory (not shown) separate from the main memory 108 for increased security.

The processor 104 is illustratively embodied as a single core processor having a processor core 110. However, in other embodiments, the processor 104 may be embodied as a multi-core processor having multiple processor cores 110. Additionally, the computing device 100 may include additional processors 104 having one or more processor cores 110. The processor 104 is communicatively coupled to the chipset 106 via a number of signal paths 112. The signal paths 112 may be embodied as any type of signal paths capable of facilitating communication between the processor 104 and the chipset 106. For example, the signal paths 112 may be embodied as any number of wires, printed circuit board traces, via, bus, intervening devices, and/or the like. The chipset 106 may include a memory controller hub (MCH) or northbridge, an input/output controller hub (ICH) or southbridge, and a firmware device. In such embodiments, the firmware device may be embodied as a memory storage device for storing Basic Input/Output System (BIOS) data and/or instructions and/or other information.

The chipset 106 is communicatively coupled to the memory 108 via a number of signal paths 114. Similar to the signal paths 112, the signal paths 114 may be embodied as any type of signal paths capable of facilitating communication between the chipset 111222 and the memory device 108 such as, for example, any number of wires, printed circuit board traces, via, bus, intervening devices, and/or the like. The memory 108 may be embodied as one or more memory devices or data storage locations including, for example, dynamic random access memory devices (DRAM), synchronous dynamic random access memory devices (SDRAM), double-data rate dynamic random access memory device (DDR SDRAM), and/or other volatile memory devices. Additionally, although only a single memory device 108 is illustrated in FIG. 1, in other embodiments, the mobile computing device 100 may include additional memory devices.

In some embodiments, the computing device 100 may include a data storage device(s) 118, one or more peripheral devices 120, and communication circuitry 124. In such embodiments, the chipset 106 is also communicatively coupled to the data storage device(s) 118 peripheral devices 120, communication circuitry 124, and the context policy enforcement engine 102 via signal paths 116. Again, similar to the signal paths 112, 114, the signal paths 116 may be embodied as any type of signal paths capable of facilitating communication between the chipset 112 and the data storage device(s) 118 peripheral devices 120, communication circuitry 124, and the context policy enforcement engine 102 such as, for example, any number of wires, printed circuit board traces, via, bus, intervening devices, and/or the like.

The data storage device(s) 118 may be embodied as any type of device configured for the short-term or long-term storage data such as, for example, memory devices and circuits, memory card, hard disk drives, solid-state drive, or other data storage device. The peripheral devices 120 may include any number of peripheral devices including input devices, output devices, and other interface devices. For example, the peripheral devices 120 may include a display screen and keyboard of the computing device 100. The particular devices included in the peripheral devices 120 may depend upon, for example, the intended use of the computing device.

The Communication Circuitry

The communication circuitry 124 may be embodied as any number of devices and circuitry for enabling communications between the mobile computing device 100 and one or more remote devices. For example, the communication circuitry 124 may include one or more wired or wireless network interfaces to facilitate wired or wireless communications with the remote devices 130, 140. In some embodiments, a remote device 130 may communicate with the mobile computing device 100 over a communication path 132, which may be wired and/or wireless. Additionally or alternatively, a remote device 140 may communicate with the mobile computing device 100 over a communication path 142, which may be wired and/or wireless, via a network 1344.

The network 144 may be embodied as any type of wired and/or wireless network such as a local area network, a wide area network, a publicly available global network (e.g., the Internet), or other network. Additionally, the network 144 may include any number of additional devices to facilitate the communication between the mobile computing device 100 and the remote device 140 such as routers, switches, intervening computers, and the like. The remote devices 130, 140 may be embodied as any type of computing devices separate from the computing device 100. For example, the remote devices 130, 140 may be embodied as one or more computers, mobile devices such as laptops, cell phones, and mobile internet devices, or other computing devices configured to communicate with the mobile computing device 100.

In some embodiments, the mobile computing device 100 may also include one or more sensors 150 communicatively coupled to the context policy enforcement engine 102 via signal paths 152. Similar to the signal paths 112, 114, 116, the signal paths 152 may be embodied as any type of signal paths capable of facilitating communication between the sensors 150 and the policy enforcement engine 102. The sensors 150 may be embodied as any type of sensor or sensor network configured to determine one or more parameters of the context of a user. For example, the sensors 150 may be embodied as any number of location sensors for determining the location of the user, biometric sensors for determining biometric data of the user, temperature sensors, altitude sensors, radio frequency identification (RFID) transmitters and/or receivers, data scanners or readers, and/or other sensors and/or devices for configured to sense or otherwise gather data indicative of a parameter of the context of the user. Further, it should be appreciated that the computing device 100 may include other components, sub-components, and devices not illustrated in FIG. 1 for clarity of the description.

As discussed above, the computing device 100 is configured to facilitate control of the use of context information of the user. For example, the computing device 100 may control the use of context information requested by the remote devices 130, 140 and/or otherwise provided by the mobile computing device 100 and/or other devices and/or sensors. The context information may include any information or data that defines the context of the user such as, for example, the location, activity, or environment of the user. For example, in some embodiments, the context of the user may be defined by a plurality of context parameters that each defines a particular aspect of the context of the user at a particular point in time. Such context parameters may include, for example, the location of the user, the current activity of the user, environmental data of the environment in which the user is located, biometric data of the user, and the like. Additionally, each context parameter may have one or more characteristics associated therewith that define the level of specificity of the context parameter. Such characteristics may include, for example, the granularity of the context parameter data (e.g., what city is the user located in, what building is the user located in, what are the GPS coordinates of the user, etc.), the confidence of the context parameter (e.g., what is the likelihood that the context parameter data is accurate, what data collection methods were used, etc.), and the currency of the context parameter data (e.g., when was the data collected, how old is the data, when is the next context update, etc.). Of course, it should be appreciated that the context of the user may be defined other context schemas, data structures, and data in other embodiments.

Figure 2:
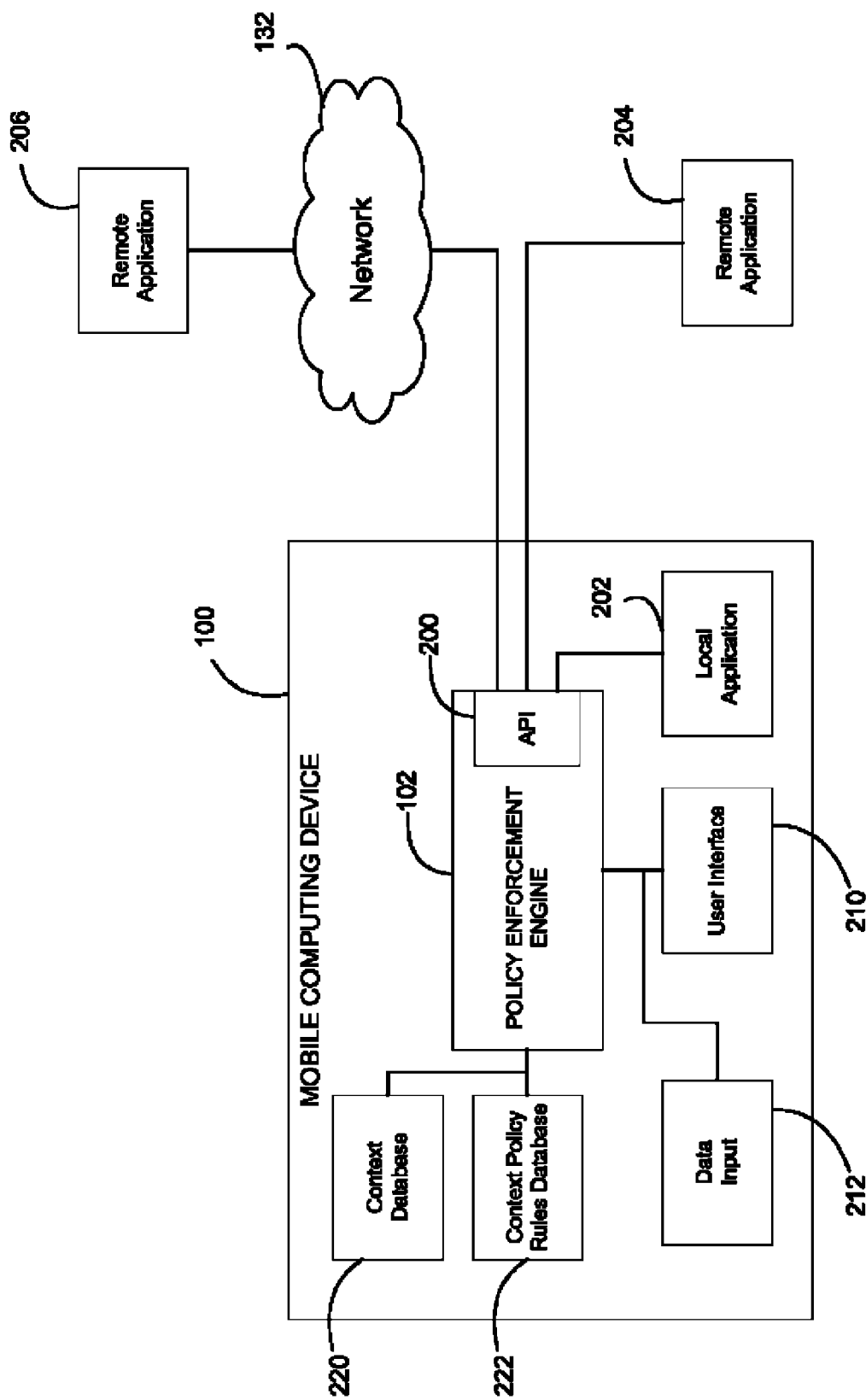
FIG. 2 is a simplified block diagram of a software environment of the mobile computing device of FIG. 1.

Referring now to FIG. 2, in use, the mobile computing device 100 includes a plurality of software modules, applications, and/or programs to facilitate control of the use of context information of the user. As discussed above, the context policy enforcement engine 102 may be embodied as hardware, firmware, and/or software modules and devices. In the illustrative embodiment, the context policy enforcement engine 102 includes an application program interface 200 to facilitate interaction between the context policy enforcement engine 102 and local applications 202 and/or remote applications 204, 206. The local applications 202 may be embodied as any software or firmware applications executed on the mobile computing device 100 that request context information related to the user of the device 100. Similarly, the remote applications 204, 206 may be embodied as any software or firmware applications executed on the remote devices 130, 140 that request context information related to the user of the device 100. The remote application 204 may request such context information from the mobile computing device 100 over the communication path 132 and the remote application 206 may request the context information from the device 100 over the communication path 142.

The mobile computing device 100 also includes a context database 220 and a context policy database 222. The databases 220, 222 may be embodied as data stored in a suitable data structure and location such as, for example, a relational database, a flat file database, or data stored in the memory 108 and/or data storage 118. In some embodiments, the context database 220 and/or the context policy database 222 may be encrypted or otherwise include some form of security.

Figure 3:
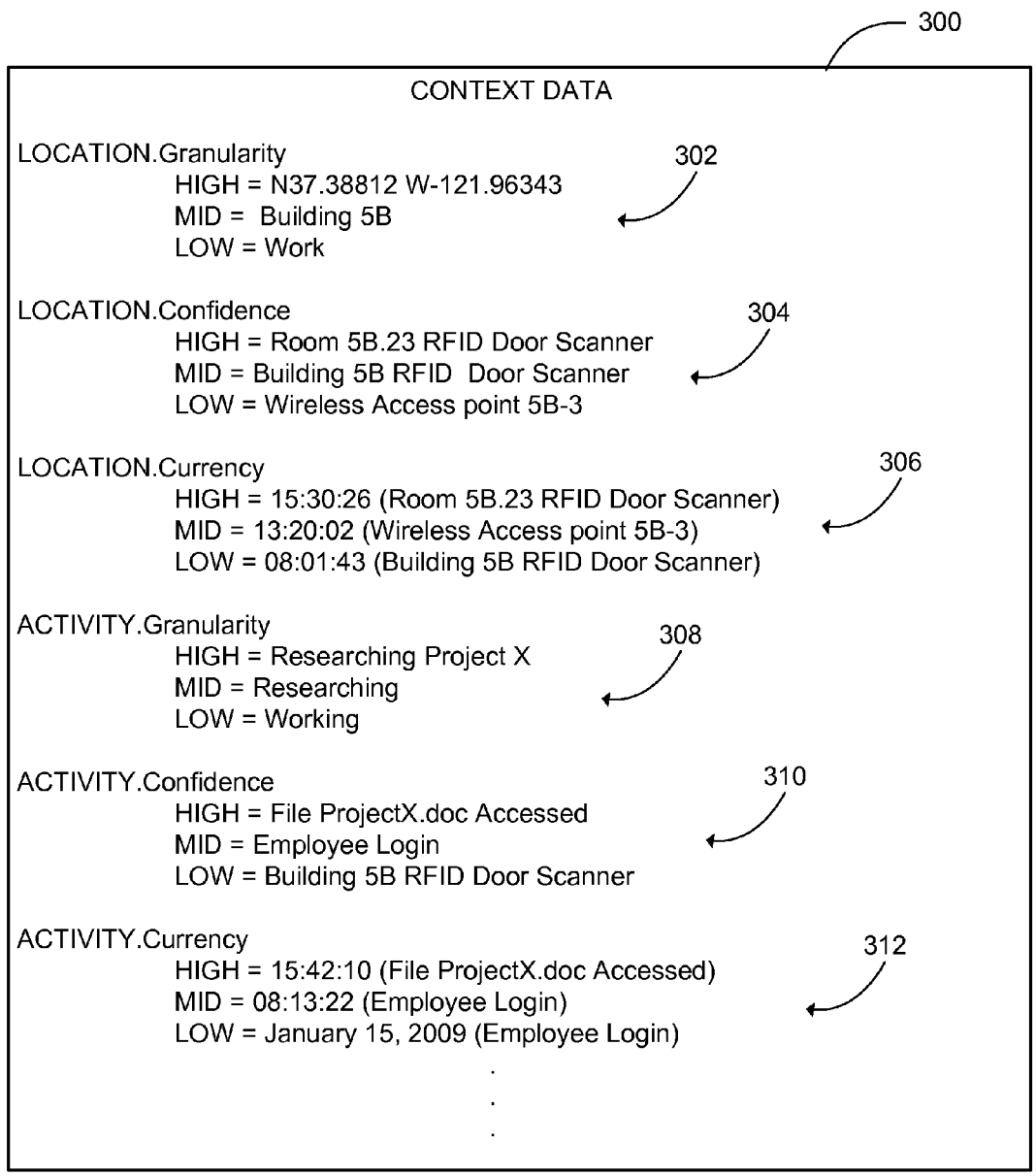
FIG. 3 is a simplified data structure of one embodiment of a context database.

The context data may be stored in the context database 220 in any suitable data form or schema. For example, one embodiment of a data structure or schema 300 for storing the context data related to the user is shown in FIG. 3. As discussed above, in some embodiments, the context of the user may be defined by a plurality of context parameters (e.g., location, activity, environmental aspects, etc.), each having an associated characteristic (e.g., granularity, confidence, currency, etc.). For each parameter-characteristic combination, context data of varying levels of specificity may be stored or otherwise determined such that requests for context data may be responded to with context data having a selected level of specificity as desired by the user. For example, in one embodiment, the context data structure 300 may include context data 302 that defines three levels of specificity for the granularity characteristic of the location context parameter. As shown, the location granularity includes a high granularity level indicating that the user is at a particular GPS coordinate location, a middle granularity level indicating that the user is inside a particular building at work, and a low granularity level indicating that the user is simply at work. As discussed in more detail below, the user and/or policy enforcement engine 102 may select the level of specificity of the context data to provide the requesting application or entity based on the context policy rule data. As such, the user may decide to provide only low level of granularity of the location of the user to, for example, publicly available applications (e.g., a Twitter® application). Alternatively, the user or computing device 100 may decide to provide a high level of granularity of the location of the user if the requesting application is an application at work or from a family member as discussed in more detail below.

The illustrative context data structure 300 also includes a context data 304 that defines three levels of specificity for the confidence characteristic of the location context parameter. The illustrative confidence characteristic includes a high granularity level indicating the user swiped his RFID tag at an entry door to a particular room, which provides a high degree of confidence that the user is actually within the room or at a GPS coordinate within the room. The illustrative confidence characteristic also includes a middle granularity level indicating that the user swiped his RFID inside at an entry door to a particular building at work, which provides a degree of confidence that the user is within that particular building. Additionally, the illustrative confidence characteristic includes a low confidence level indicating the user accessed a wireless access point that includes the building (but may include other buildings within the work campus area).

The illustrative context data structure 300 additionally includes a context data 306 that defines three levels of specificity for the currency of the location context parameter. The illustrative currency characteristic includes a high currency level indicating that a room entry door RFID scanner was activated recently, a middle currency level indicating that a wireless access point was accessed a particular time prior to the high currency level event, and a low currency level indicating that the user activated the entry door RFID scanner to the building earlier that morning.

The illustrative context data structure 300 may include additional data related to additional context parameters the define the context of the user of the mobile computing device 100. For example, as shown in FIG. 3, the context data structure may include context data 308 defining the granularity characteristic of the activity context parameter, a context data 310 defining the confidence characteristic of the activity context parameter, a context data 320 defining the currency characteristic of the activity context parameter, and any other context data used to define the current or historical context of the user. It should be appreciated, however, that the context data structure 300 is just one of several data schema that may be used to store the context data related to the user. In other embodiments, other data structures or schema may be used. For example, in some embodiments, the context data may be stored with more or less levels of specificity for each context parameter, without use of context parameter characteristics (e.g., the context location parameter is defined simply as the GPS coordinates the user, the building in which the user is currently located, etc.), or using some other data stricture or schema depending on the particular application and implementation of the mobile computing device 100. Additionally, in some embodiments, the context data of the user may not be stored, but rather collected on an "as needed" basis. For example, the location of the user of the mobile computing device may be determined upon receipt of a request for the context data rather than prior thereto.

The context policy database 220 includes a set of context policy rules that define how the computing device 100 is to respond to requests for context information of the user from, for example, the applications 202, 204, 206. The context policy rules may dictate how to respond to the context request based on any appropriate data such as data related to the requesting entity (e.g., which application is requesting the data, the identity of the requesting entity, etc.), current or historical context data (e.g., the current location or activity of the user), or other data related to the context of the user (e.g., the time of day, day of the week, etc.). As described above, in some embodiments, the context data may include multiple levels of specificity of context data and, in such embodiments, the context policy rules may define which level of specificity (e.g., which level of location granularity) is to be provided to the requesting application or entity.

The context policy rules may be embodied as any type of rule, collection of rules, and/or the like that define how the computing device 100 should respond to various requests for context data. As discussed above, the rule decisions may be based on various parameters and/or data including, but not limited to, the type of application requesting the context data, the identification of the requesting entity, the location of the requesting entity, the predefined group with which the requesting entity/application is associated, other context data of the user, and/or other environmental or other data that defines the context of the user. Additionally, the structure of the context policy rules may varying depending on the application and implementation of the mobile computing device 100.

Figure 4:
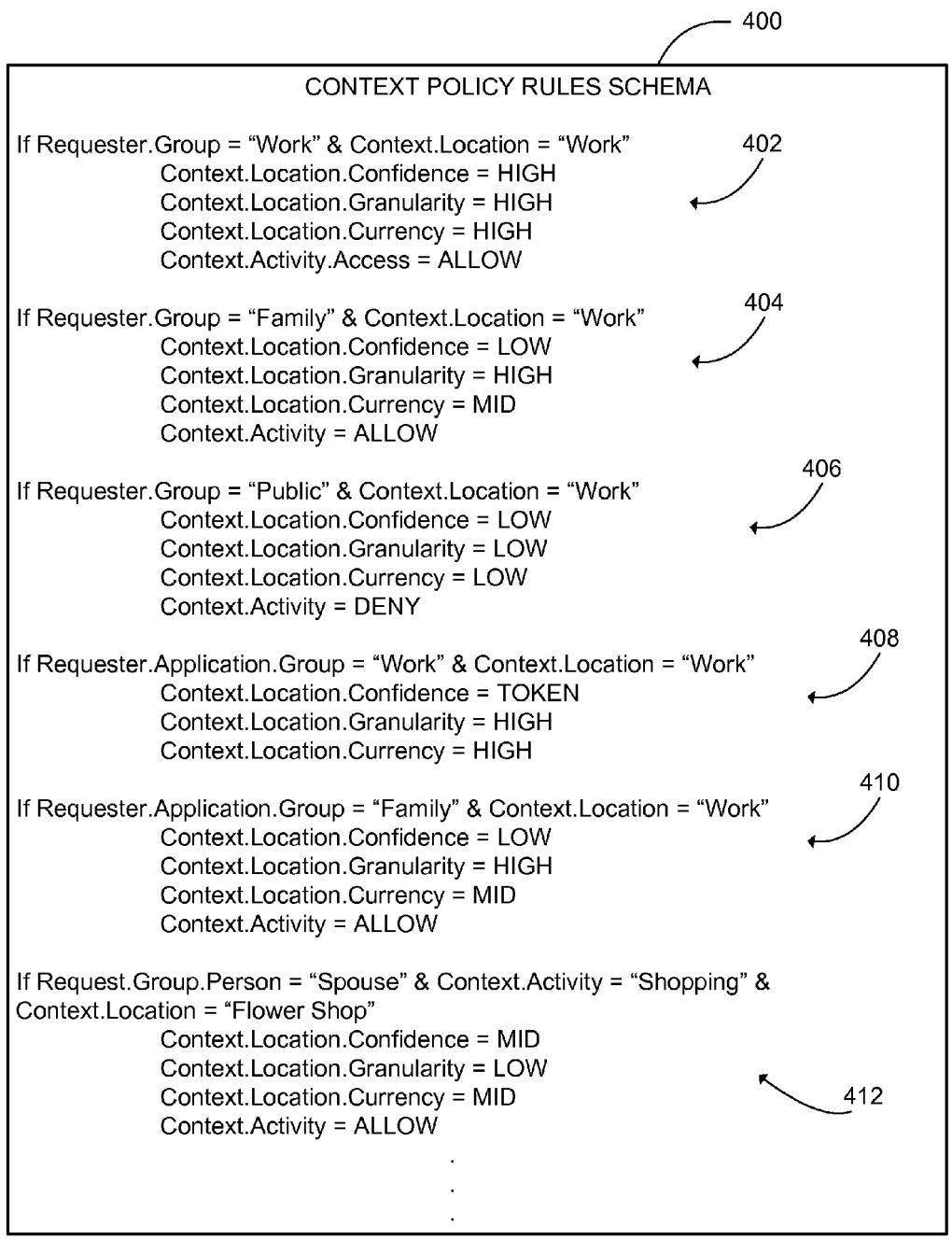
FIG. 4 is a simplified data structure of one embodiment of a context policy database.

One illustrative embodied of a context policy rule schema or data structure 400 is illustrated in FIG. 4. The illustrative context policy rule schema 400 includes a plurality of context policy rules 402, 404, 406, 408, 410, 412 that define how the computing device 100 should respond to requests for context data (e.g., what content of context data should be delivered to the requesting application or entity). For example, context policy rule 402 defines the level of specificity for each characteristic for the location parameter of the context of the user. In this embodiment, if the requesting entity (e.g., application, company, or individual) belongs to the a group called "work" and if the user of the computing device 100 is current at work, then the context data defined as having a high confidence, high granularity, and high currency may be provided to the requesting application or entity. As discussed above, in some embodiments, the context data stored in the context database 220 may include data entries for each level of specificity. However, in other embodiments, the context data may be determined based on the policy rule 402 in response to the request for context data. That is, the context policy rule 402 defines the level of specificity of the context parameter that must be determined to respond to the request.

In some embodiments, the context policy rules 400 may also include binary type rules that allow or disallow access to particular context data, rather than defining the specificity of the data or the data itself. For example, the context policy rule 402 includes a definition for the access characteristic of the activity context parameter that allows applications in the group "work" to have access to the context data related to the activity of the user when the user is located at "work." Additionally, the context policy rules 400 may include other rules such as policy rules 404 and 406 that define how the mobile computing device 100 should respond to requests from entities associated with other groups such as the group "family" and the group "public." Such groups may be defined be predefined, defined by the user, or defined by the requesting application or entity.

In some embodiments, the context policy rules 400 may also define an action to be taken by the mobile computing device 100 in addition to or in place of context data. For example, the context policy rule 406 defines the confidence characteristic of the location parameter as requiring a token to prove the location of the user. As such, the mobile computing device 100 may be configured to transmit a software token that was previously received as proof of the location of the user to the requesting application/entity (e.g., remote applications 204, 206). Additionally, the context policy rules 400 may use any number of rule qualifiers to define the rule itself. For example, the context policy rule 412 defines context data that should be provided to a requesting application if the requesting person is identified as "spouse", the user's activity is "shopping", and the user is currently located in a location identified as "flower shop." As shown, the context policy rule 412 provides a low granularity for the location parameter such that the requesting entity cannot determine exactly where the user is (e.g., so as not to run a well planned surprise). Although the context policy rules 400 define an illustrative set of context policy rules, it should be appreciated that the context policy rules may include additional or other context policy rules having the same or other rule form may be used. Additionally, in some embodiments, the context database 220 and the context policy database 222 may be combined in a single database in which the context policy rules directly define or identify the context data to be used to respond to a request for context data of the user given the particular qualifiers identified in each context policy rule.

Referring back to FIG. 2, the mobile computing device 100 may additionally include a user interface 210, which is usable by the user to interact with the policy enforcement engine 102, the context database 220, and/or the context policy database 222. The user interface 210 may be embodied as any suitable user interface, such as a graphical user interface (GUI), that facilitates interaction between the user and the mobile computing device 100. The user interface 210 may be configured, for example, to allow the user to add, delete, update, or otherwise modify the context policy rules included in the context policy rule database. For example, the user may decide to allow access all applications in the "public" group to location context data having high granularity. If so, the user may interact with the user interface to update the associated context policy rule. Additionally, the user may define which requesting applications or entities below to which group or otherwise define groups or associations of applications and entities with which various context policy rules may be created and defined.

In some embodiments, the policy enforcement engine 102 may allow the user to update context data related to the user and stored in the context database. For example, in certain circumstances, some of the context data may be unavailable through automatic collection means (e.g., location via a GPS sensor). In such cases, the user may supply, update, modify, or correct the context data or otherwise add additional details related to the context data via use of the user interface. For example, if the user is at a particular flower shop, the user may enter the name of the flower shop rather than the generic "flower shop" location tag such that authorized requesting applications have access to more specific or other an increased amount of context data.

In some embodiments, the mobile computing device 100 may also include a data input 212, which may be embodied as any type of data input the delivers context data to the policy enforcement engine 102. For example, in embodiments wherein the mobile computing device 100 includes sensor(s) 150, the data input 212 may be embodied as the sensor data from such sensors 150. For example, the sensors 150 may provide contextual data related to the user's environment, such as temperature, altitude, or location, to the policy enforcement engine 102. In response, the policy enforcement engine 102 updates the context data stored in the context database 222.

Figure 5:
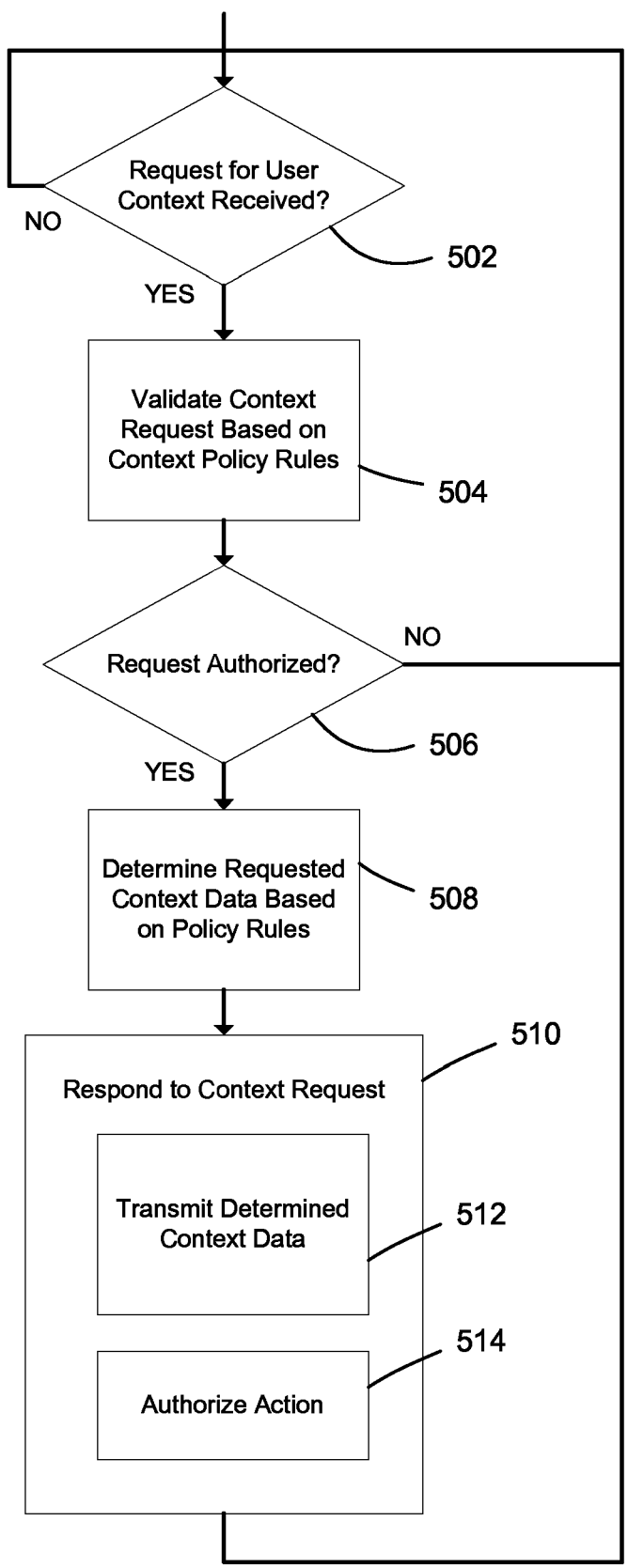
FIG. 5 is a simplified flow diagram of one embodiment of a method for controlling use of context information of a user executed by the mobile computing device of FIG. 1.

Referring now to FIG. 5, in use, the mobile computing device 100 may be configured to execute a method 500 for controlling use of context data related to a user of the device 100. The method 500 may be executed by, for example, the policy enforcement engine 102 and/or the processor 104. The method 500 begins with step 502 in which a request for user context is received from an application such as the local application 202 or remote applications 204, 206. In block 504, the computing device 100 may be configured to validate the context request based on the context policy rules stored in the context policy rule database 222. The request for user context may be validated by any suitable mechanism to ensure that the request is for context data of the user of the device 100 and is otherwise authorized to receive context data of some level of specificity. As such, the user of the device 100 may simply ignore or otherwise refuse to respond to requests for context data received from particular requesting applications or entities, during particular time periods of the day, on particular days, or based on some other predetermined criteria.

If the request is not authorized in block 506, the method 500 loops back to block 502. However, if the request for context data is authorized in block 506, the context data is determined in block 508 based on or according to the context policy rules stored in the context policy rule database 222. That is, the context data that is to be provided to the requesting application or entity is determined in block 508. As discussed above, one or more context policy rules of the context policy rule database 222 may be used to determine which and how much of the context data stored in the context database 220 should be provided to the requesting application/entity. For example, referring to the illustrative embodiment of FIGS. 3 and 4, if the requesting application belongs to group "public" and the user is currently in the location defined as "work," the parameter characteristic is defined as LOW and as such the context location that may be provided to the requesting application is identified as "Work" in the context data 300.

Referring back to FIG. 5, in block 510, the mobile computing device 100 responds to the requesting application or entity with the context data determined in block 508. To do so, the mobile computing device 100 may be configured to transmit the context data to the requesting application in sub-block 512. Additionally or alternatively, if the context policy rule defines an action or restriction of an action, the mobile computing device 100 may be configured to authorize or deny the requested action in 514. For example, in embodiments wherein the mobile computing device 100 is embodied as a cellular telephone and the context policy rules dictate that no ringer should be used when the user's current activity context is defined as "meeting," a local ringer application executed on the device 100 may request authorization to activate the ringer of the cell phone from the policy enforcement engine 102. In response, the policy enforcement engine would authorize or deny the ringer application based on the location of user at the time of the request (i.e., based on the context policy rules and the context data of the user). As such, the mobile computing device 100 is configured to control the user of context information related to the user by establishing a context policy engine 102 that determines the response to such request based on a set of policy rules included in the context policy rule database 222.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

The invention claimed is:

1. A method comprising:
    establishing a context policy enforcement engine on a mobile computing device;
    receiving, from a requesting entity, a request for context information related to a user of the mobile computing device;
    retrieving context policy data with the context policy enforcement engine, the context policy data defining a set of rules for responding to context requests;
    determining a level of specificity of a context characteristic for a context parameter associated with the requested context information as a function of the context policy data and an identity of the requesting entity;
    retrieving context data identified by the determined level of specificity of the context characteristic for the context parameter associated with the requested context information; and
    responding to the request for context information with the retrieved context data.

2. The method of claim 1, wherein establishing a context policy enforcement engine comprises establishing the context policy enforcement engine in a secured boot environment.

3. The method of claim 1, wherein the establishing the context policy enforcement engine comprises establishing the context policy enforcement engine in software.

4. The method of claim 1, wherein receiving the request for context information comprises receiving the request for context information from a software application.

5. The method of claim 1, wherein receiving the request for context information comprises receiving a request for at least one of: a location of the user, an activity of the user, an aspect of the environment in which the user is located, and biometric data related to the user.

6. The method of claim 1, wherein receiving the request for context information comprises receiving a request for (i) the location of the user and (ii) at least one additional context parameter related to the user.

7. The method of claim 1, wherein:
    the context policy data defines a context policy rule based on the identification of the requesting entity.

8. The method of claim 7, wherein the context policy data defines a rule based on a predetermined group of requesting entities.

9. The method of claim 1, wherein the context policy data defines a rule based on a context parameter associated with the user.

10. The method of claim 1, wherein the context policy data defines a rule based on the requested context information and a location of the user at the time of receiving the request for context information.

11. The method of claim 1, wherein the context policy data defines a rule based on the requested context information and the time of day at which the request for context information is received.

12. The method of claim 1, wherein the context policy data defines a rule based on the requested context information and an activity of the user.

13. The method of claim 1, wherein responding to the request comprises determining context data based on the set of rules of the context policy data.

14. The method of claim 13, wherein responding to the request further comprises retrieving the context data from a context database with the context policy enforcement engine based on the set of rules of the context policy data.

15. The method of claim 14, wherein responding to the request further comprises transmitting the context data.

16. The method of claim 13, wherein determining the context data comprises selecting context data from a plurality of datum defining a context parameter of the user, the plurality of datum having different levels of specificity defined in the set of rules of the context policy data.

17. The method of claim 13, wherein:
a context of the user is defined by a plurality of context parameters and the context policy data defines the set of rules based on a plurality of parameter characteristics associated with each context parameter,
determining the context data comprises determining the context data for at least one of the parameter characteristics defined in the context policy data.

18. The method of claim 1, further comprising:
receiving user-supplied context policy rule with the mobile computing device, and
updating the context policy data with the user-supplied context policy rule with the context policy enforcement engine.

19. The method of claim 1, further comprising:
receiving user-supplied context data related to the user with the mobile computing device, and
updating a context database stored on the mobile computing device with the user-supplied context data.

20. The method of claim 1, further comprising:
receiving context data related to the user from a source remote to the mobile communication device; and
updating a context database stored on the mobile computing device with the user-supplied context data.

21. A non-transitory, machine readable medium comprising a plurality of instructions, that in response to being executed, result in a computing device:
establishing a context policy enforcement engine on a mobile computing device;
retrieving context policy data with the context policy enforcement engine in response to receiving a request for context information related to a user of the computing device, the context policy data defining a set of rules for responding to context requests;
determining a level of specificity of a context characteristic for a context parameter associated with the requested context information as a function of the context policy data and an identity of a requesting entity that requested the context information;
retrieving context data identified by the determined level of specificity of the context characteristic for the context parameter associated with the requested context information; and
responding to the request for context information with the retrieved context data.

22. The non-transitory, machine readable medium of claim 21, wherein responding to the request comprises determining context data based on the set of rules of the context policy data.

23. The non-transitory, machine readable medium of claim 22, wherein responding to the request further comprises retrieving the context data from a context database with the context policy enforcement engine based on the set of rules of the context policy data.

24. The non-transitory, machine readable medium of claim 22, wherein determining the context data comprises selecting context data from a plurality of datum defining a context parameter of the user, the plurality of datum having different levels of specificity defined in the set of rules of the context policy data.

25. A mobile computing device comprising:
a context policy enforcement engine;
a processor; and
a memory device having stored therein a plurality of instructions, which when executed by the processor, cause the context policy enforcement engine to:
retrieve context policy data in response to receiving a request for context information related to a user of the computing device, the context policy data defining a set of rules for responding to context requests;
determine a level of specificity of a context characteristic for a context parameter associated with the requested context information as a function of the context policy data and an identity of a requesting entity that requested the context information;
retrieve context data identified by the determined level of specificity of the context characteristic for the context parameter associated with the requested context information; and
respond to the request for context information with the determined retrieved context data.

* * * * *